W. C. WINFIELD.
METHOD OF MAKING BILGED CYLINDERS.
APPLICATION FILED MAY 6, 1914.
1,151,984.
Patented Aug. 31, 1915.
2 SHEETS—SHEET 1.
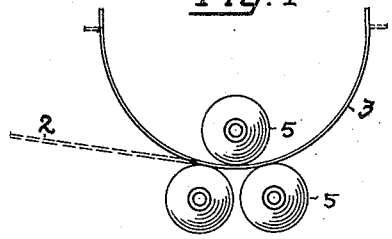
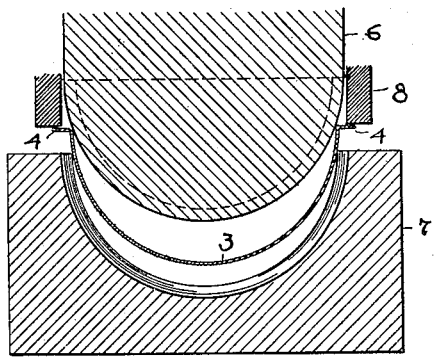
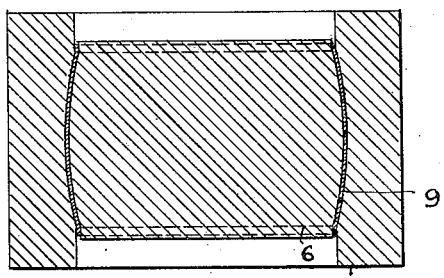
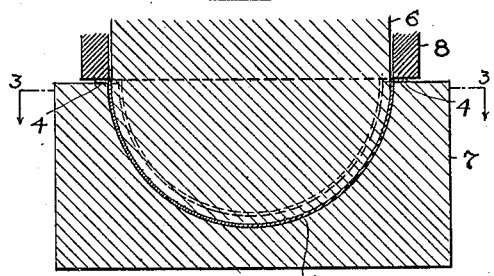
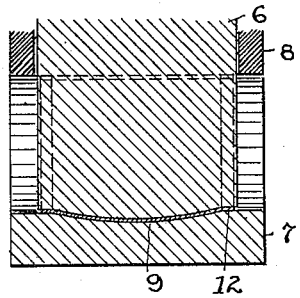
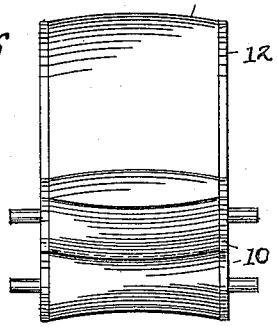
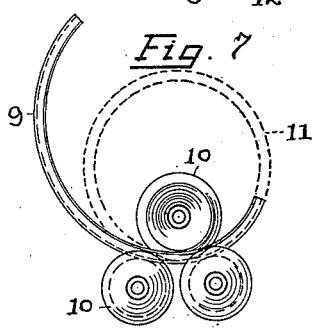
Witnesses.
B. C. Taylor.
Inventor:
William C. Winfield
by Fisher & Moser
Atty.

W. C. WINFIELD.
METHOD OF MAKING BILGED CYLINDERS.
APPLICATION FILED MAY 6, 1914.
1,151,984.
Patented Aug. 31, 1915.
2 SHEETS—SHEET 2.
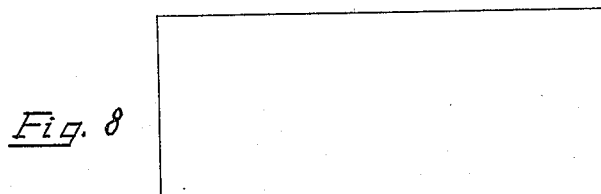
Fig. 8
Fig. 9
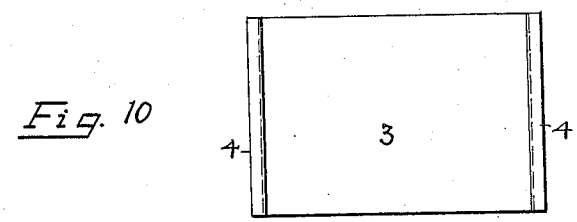
Fig. 10
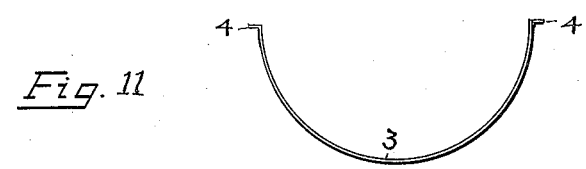
Fig. 11
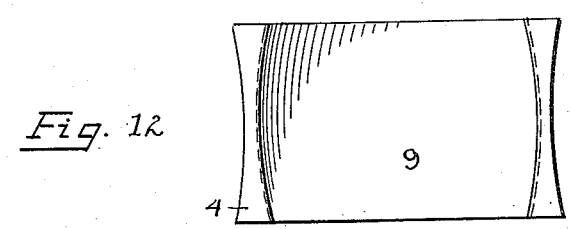
Fig. 12
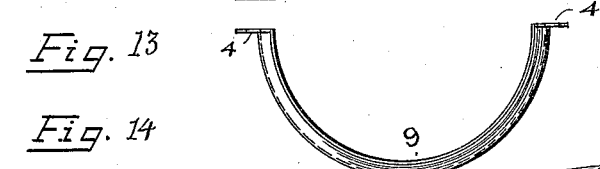
Fig. 13
Fig. 14
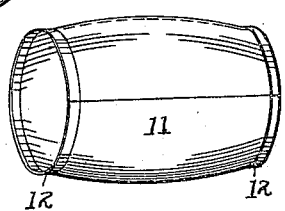
Fig. 15
Witnesses.
B. C. Taylor.
Inventor
William C. Winfield
by Fisher ⁊⁊⁊⁊⁊
Atty.

UNITED STATES PATENT OFFICE.

WILLIAM C. WINFIELD, OF WARREN, OHIO, ASSIGNOR TO AMANDA CUMMINS WINFIELD, OF WARREN, OHIO.

METHOD OF MAKING BILGED CYLINDERS.

1,151,984.      Specification of Letters Patent.      Patented Aug. 31, 1915.

Application filed May 6, 1914. Serial No. 836,621.

*To all whom it may concern:*

Be it known that I, WILLIAM C. WINFIELD, citizen of the United States, residing at Warren, in the county of Trumbull and State of Ohio, have invented certain new and useful Improvements in Methods of Making Bilged Cylinders, of which the following is a specification.

My invention relates to an improved method of producing bilged cylinders, and the invention consists in the combination of steps substantially as herein shown and described and more particularly pointed out in the claim.

In the accompanying drawings, Figure 1 is an end elevation of a set of rolls shaping a flat plate into semi-circular form. Fig. 2 is a view of the curved plate seated between two die members preliminary to the bilging of the plate. Figs. 3, 4 and 5 are sectional views showing the die members bilging the plate. Figs. 6 and 7 are side and end elevations showing a set of rolls forming the curved and bilged plate into a cylinder. Sheet 2, Figs. 8 and 9 show face and edge views respectively of a flat metal plate, and Figs. 10 and 11 are similar views of the said plate curved to a semi-circle with projecting end flanges. Figs. 12 and 13 are plan and side elevations of the curved plate in bilged form, and Fig. 14 is a view similar to Fig. 13 but showing the end flanges sheared off. Fig. 15 is a perspective view of the complete cylinder.

My improved method of producing a bilged cylinder for a barrel or keg or other container consists in first shaping a flat plate of metal 2 of the required size into a semi-circular or substantially semi-circular plate 3 with projecting flanges 4 at its opposite ends. This step may be accomplished by passing the plate 2 through a set of rolls 5 and bending the ends 4 to the required angle thereafter, or this step may be effected by stamping or pressing if desired.

The second step consists in bilging the curved plate 3 to substantially the curvature which the complete cylinder is to possess, such step being preferably practised by introducing the curved plate 3 between two die members 6 and 7 of a double acting press and by the application of pressure and a drawing effect in which the blank holder 8 of the press takes a part by engaging the flanged ends 4 of the curved plates 3, see Figs. 2 to 5. The product of this step consists of a substantially semi-circular segment 9 which is bilged throughout and comprises the flanges 4 in a somewhat altered form, see Figs. 12 and 13.

The third step consists in shearing off the flanges 4 and passing the curved and bilged segment 9 through a set of suitable rolls 10 to produce a complete cylinder 11, the rolls being arranged to alter the curvature of the segment to a smaller radius so that when the rolling operation is finished a perfect circular cylinder of bilged formation is obtained, see dotted lines Fig. 7. The longitudinal edge portions of the cylinder may be brought into abutting or overlapping relations and united by rivets or by welding operations. The cylinder may also be pressed or rolled with straight annular portions 12 at its ends to permit suitable heads to be affixed thereto by a flanged union, but the attachment of the heads is not an essential step in this invention and therefore is not shown.

By practising the steps as outlined I am enabled to produce a metal cylinder of bilged formation without materially weakening the body thereof at any essential point, and the operations are simple and inexpensive, and rapidly carried out.

What I claim is:

A method of producing bilged cylinders consisting in curving a flat plate and forming projecting flanges at the ends of the plate; bilging the curved plate by pressure; removing the flanges and finally bending the bilged product into a complete cylinder.

In testimony whereof I affix my signature in presence of two witnesses.

WILLIAM C. WINFIELD.

Witnesses:
R. B. MOSER,
B. C. TAYLOR.

Copies of this patent may be obtained for five cents each, by addressing the "Commissioner of Patents, Washington, D. C."